April 23, 1946.   H. F. MAYNES   2,399,132

FISHING REEL

Original Filed Oct. 26, 1939

INVENTOR
HYLA F. MAYNES
BY
Beau, Brooks, Buckley & Beau.
ATTORNEYS

Patented Apr. 23, 1946

2,399,132

UNITED STATES PATENT OFFICE 2,399,132

FISHING REEL

Hyla F. Maynes, North Tonawanda, N. Y., assignor of one-half to Emma C. Maynes, North Tonawanda, N. Y.

Original application October 26, 1939, Serial No. 301,455, now Patent No. 2,340,892, dated February 8, 1944. Divided and this application January 8, 1944, Serial No. 517,493

3 Claims. (Cl. 242—84.1)

This invention relates to a fishing reel and has particular relation to reels of the general type disclosed in my Patents No. 2,130,670 and No. 2,130,671, both granted on September 20, 1938, and No. 2,220,017 granted October 29, 1940, and constitutes an improvement in reels of this type. The present application is a division of my copending application Serial No. 301,455 filed October 26, 1939, now Letters Patent No. 2,340,892 dated February 8, 1944.

The present invention provides an improved reel structure with novel line guide structure for defining the angular zone of emergence of the line from the reel. More particularly, the invention provides an improved reel frame structure comprising a pair of end members having spacing pillars therebetween, the end members having opposed recesses in their inner faces for interlockingly receiving flanges of an annular line guide whereby the latter may be engaged or disengaged from the frame upon partial rotation.

The novel features of the present invention, and the objects and advantages thereof, will appear from the following description of the typical embodiment shown in the accompanying drawing, wherein.

Figure 1:
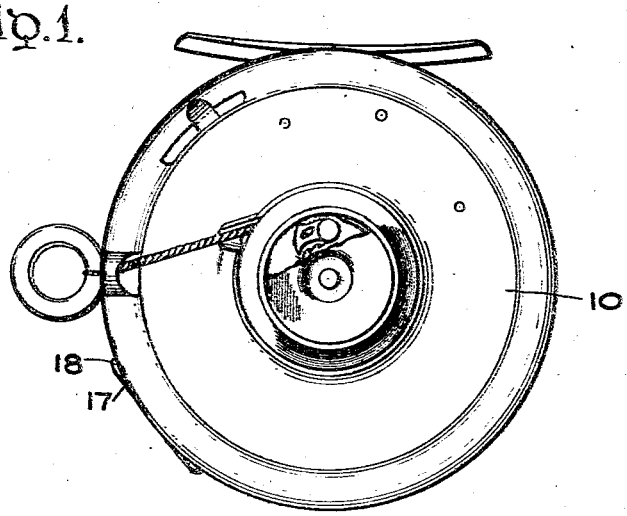
Fig. 1 is a side elevational view with a fragment of one part broken away.
Figure 2:
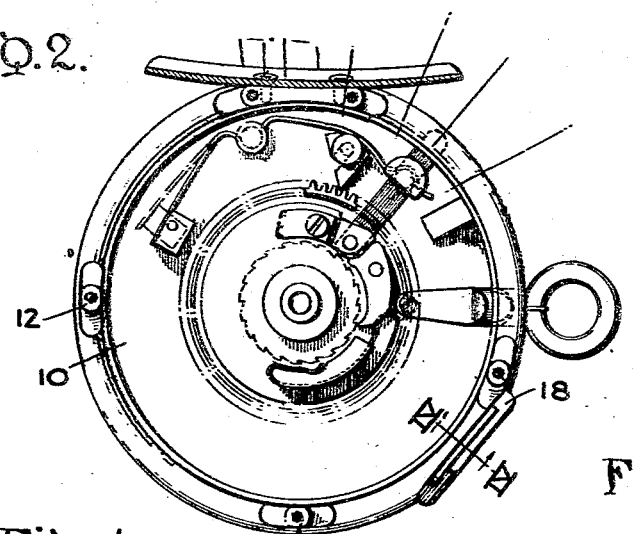
Fig. 2 is a vertical sectional view.
Figure 3:
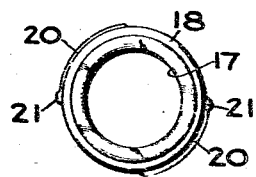
Fig. 3 is an elevational view of a line guide element employed in the reel construction.

As shown in the drawing the reel has a frame consisting of a side plate 10 and a ring 11 spaced therefrom by connecting pillars 12. The construction of a suitable reel frame of this type is shown and described in Patent No. 2,232,253 granted to me February 18, 1941. The details of construction of the line winding spool and other appurtenances of the reel which do not concern the invention of the present application need not be referred to further herein.

Figure 4:
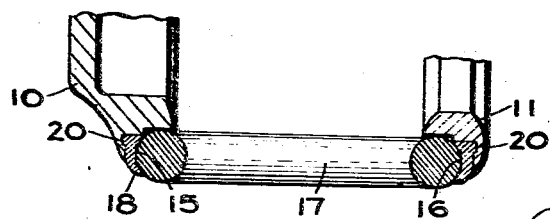
Fig. 4 is an enlarged sectional view through the reel along a line indicated at IV—IV on Fig. 2.

As appears in Fig. 4, the frame portions 10 and 11 are formed with facing channeled recesses 15 and 16, respectively. A line guide ring 17 is provided with a supporting annular frame 18 which extends peripherally about the ring 17 and formed to permanently embrace the same. The ring 17 is shown as of circular transverse cross section and may be formed of glass or like material having a very low coefficient of friction. Because of the manner in which it is mounted, it may readily be removed and replaced if it becomes broken and it may likewise be readily removed as a preliminary to disassembly of the reel. Further, in the construction of the ring and its supporting frame the material of the ring may be of an ornamentally contrasting nature with respect to the remainder of the reel.

The annular frame 18 has diametrically opposite projections 20 which extend arcuately along the periphery of the frame and which terminate, at one end of each, in stop lugs 21. The assembled frame 18 and ring 17 is inserted in the space between the frame portions 10 and 11 with the spaces between projections 20 in registry with the frame portions 10 and 11.

The line guide assembly is then rotated to move the projections 20 into the recesses 15 and 16, a motion which is limited by engagement of the stop lugs 21 against the frame portions adjacent recesses 15 and 16. The ring and its supporting frame are normally retained against rotation in the frame by friction but may be released by a partial rotation opposite to that employed in assembly.

It will be understood that the reel structure herein shown and described in detail is merely illustrative of the underlying principles of the invention and that the spirit of the invention is not limited otherwise than as defined in the appended claims.

What is claimed is:

1. In a fishing reel, a frame comprising a pair of end walls and connecting means for maintaining said walls in spaced relation, a line receiving spool journaled in said end walls, facing channels formed in said end walls and extending generally in a circumferential direction with respect thereto, and an annular line guide having opposed arcuate projections adapted to seat in said channels, whereby said line guide may be assembled by placing it in position with the projections out of registry with the channels and rotating the line guide to seat the projections in said channel, each of said arcuate projections having a stop lug formed at an end thereof for defining the assembled position of said line guide by engagement against the end walls adjacent said channels.

2. In a fishing reel, a frame comprising a pair of end members and spacing pillars extending therebetween, said end members having opposed recesses in the inner faces thereof, said recesses lying in a common plane approximately tangent to said reel, and a substantially annular line guide having a pair of flat outwardly projecting spaced flanges interlockingly engageable and disengageable in said recesses upon partial rotation of the line guide.

3. In a fishing reel, a frame comprising a pair of end members and connecting means for maintaining said members in spaced relation, said end members having opposed recesses in the inner faces thereof, said recesses lying in a common plane approximately tangent to said reel, and a substantially annular line guide having a pair of flat outwardly projecting spaced flanges interlockingly engageable and disengageable in said recesses upon partial rotation of the line guide.

HYLA F. MAYNES.